United States Patent
Zwayer et al.

(10) Patent No.: US 10,660,322 B1
(45) Date of Patent: May 26, 2020

(54) BEARING SUPPORTED PICK-UP PIN FOR SPINCAST REEL

(71) Applicant: W.C. Bradley/Zebco Holdings, Inc., Tulsa, OK (US)

(72) Inventors: Kent L. Zwayer, Tulsa, OK (US); Kyle O'Dell, Fort Gibson, OK (US); Mike Mao, Jiangsu (CN)

(73) Assignee: W.C. Bradley/Zebco Holdings, Inc., Tulsa, OK (US)

( * ) Notice: Subject to any disclaimer, the term of this patent is extended or adjusted under 35 U.S.C. 154(b) by 302 days.

(21) Appl. No.: 15/648,258

(22) Filed: Jul. 12, 2017

Related U.S. Application Data

(60) Provisional application No. 62/361,339, filed on Jul. 12, 2016.

(51) Int. Cl.
  *A01K 89/01* (2006.01)

(52) U.S. Cl.
  CPC .... *A01K 89/01088* (2015.05); *A01K 89/0102* (2013.01)

(58) Field of Classification Search
  CPC .......... A01K 89/01029; A01K 89/0108; A01K 89/01085; A01K 89/01088; A01K 89/0102
  See application file for complete search history.

(56) References Cited

U.S. PATENT DOCUMENTS

| | | | | |
|---|---|---|---|---|
| 3,298,630 A * | 1/1967 | Taggart | ............. | A01K 89/0102 242/237 |
| 3,481,554 A * | 12/1969 | Hull | .................. | A01K 89/0102 242/238 |
| 5,467,932 A * | 11/1995 | Puryear | .................. | A01K 87/04 242/228 |
| 5,669,566 A * | 9/1997 | Puryear | .............. | A01K 89/0102 242/234 |
| 6,089,484 A | 7/2000 | Zwayer et al. | | |
| 6,641,070 B1 * | 11/2003 | Wong | .................. | A01K 89/0102 242/311 |
| 9,210,920 B1 * | 12/2015 | Zwayer | .............. | A01K 89/0108 |
| 9,288,973 B1 * | 3/2016 | Zwayer | .............. | A01K 89/0102 |
| 9,363,987 B2 | 6/2016 | Hiraoka | | |
| 9,949,469 B1 * | 4/2018 | Carpenter | ........ | A01K 89/01085 |
| 2006/0180690 A1 * | 8/2006 | Young | ................ | A01K 89/0102 242/238 |
| 2018/0295825 A1 * | 10/2018 | Ivie | .................. | A01K 89/01029 |

OTHER PUBLICATIONS

W.C. Bradley/Zebco's 1994 Quantum Catalog.

* cited by examiner

*Primary Examiner* — Michael E Gallion
(74) *Attorney, Agent, or Firm* — James F. Lea, III; Gable Gotwals

(57) ABSTRACT

A fishing reel designed to retain rotational functionality under load. The reel has a spool and spinner head assembly. A first pin arm is pivotally mounted to a plate portion of the spinner head assembly. A plate facing surface of the first pin arm has at least a portion that defines a planar surface from the first pivot end to the first pin arm for providing deflection resistance. A first pick-up pin selectively extends the first pin arm through a first pick-up pin orifice in a wall portion of the spinner head assembly. A first pick-up sleeve is rotationally mounted on the first pick-up pin for engaging fishing line when fishing line is wound onto said spool.

13 Claims, 8 Drawing Sheets

BEARING SUPPORTED PICK-UP PIN FOR SPINCAST REEL

CROSS REFERENCE TO RELATED APPLICATIONS

This application claims the priority of U.S. Provisional Patent Application No. 62/361,339 titled "BEARING SUPPORTED PICK UP PIN FOR SPINCAST REEL," filed Jul. 12, 2016, the contents of which are hereby incorporated by reference.

FIELD OF THE INVENTION

The invention relates to fishing reels. More particularly, the invention relates to an improved pick-up pin for spincast reels.

BACKGROUND OF THE INVENTION

Spincast reels are well known in the art. A spincast reel typically includes a central body including a frame, a front cover positionable over at least the front face of the frame and having a tapered forward wall, a back cover positionable over at least the back face of the frame, a casting button projecting from the back cover, and a crank handle extending from a side of the fishing reel. Most of the operating structures and operating mechanisms of the reel are either mounted on, formed on, or mounted through the frame. A crank handle is operable for winding a fishing line around a spool contained within the reel. The spool is typically mounted on a spool hub that projects forwardly from the front of the frame.

A spincast reel will also include a foot structure for securing the reel on a fishing rod. The foot structure typically extends from either the bottom of the body or from the bottom of the back cover.

Operating structures and mechanisms contained in a typical spincast reel include an elongate main or center shaft that slidably and rotatably extends through the frame and through the spool, a spinner head secured to the forward end of the main or center shaft, a pinion gear positioned on the main shaft, a crankshaft extending from the crank handle into the side of the reel and through a crankshaft boss provided on the rearward face of the frame, a drive gear or face gear secured on the crankshaft, an anti-reverse mechanism in communication with the crankshaft for preventing reverse rotation of the crank handle and crankshaft, and an adjustable drag system.

A pinion gear is typically retained in the reel adjacent the rear face of the frame. The pinion gear is keyed on the main or center shaft for imparting rotational movement to the center shaft while allowing the shaft to slide longitudinally through the frame. The crankshaft drive gear operably engages the pinion gear such that rotational movement is imparted to the main shaft by turning the crank handle.

When an excessive pulling force is applied to the fishing line, the drag system counteracts the anti-reverse mechanism of the reel to payout a sufficient amount of additional fishing line to prevent the line from breaking. Most drag systems function to allow either an adjustable resistance to rotational slippage of the line spool about the spool hub or to allow an adjustable resistance to rotational slippage of the drive gear about the crankshaft. A typical drag system will also include an external adjustment mechanism, such as either a finger-operated drag wheel projecting from the reel housing or a star-shaped dial operably secured adjacent the crank handle on the exterior end of the crankshaft.

The spinner head attached to the forward end of the main shaft winds fishing line on the reel spool. While winding, the spinner head is positioned over the spool. When the user turns the crank handle, the rotational movement of the handle is mechanically transferred to the spinner head by means of the drive or face gear, the pinion gear, and the center shaft. The spinner head typically includes a mechanism for holding and positioning the fishing line so that, as the spinner head rotates, the spinner head wraps line around the spool. The mechanism is typically a set of line-grasping notches formed in a rearward edge of the spinner head or a spring-loaded pick-up pin or pins that project laterally through a sidewall of the spinner head.

A spincast reel will also typically include a biasing member for biasing the main or center shaft rearwardly toward engagement with the casting button. The biasing member commonly consists of a spring positioned around the rearward portion of the center shaft. The spring is typically attached to or retained by the rearward end of the main shaft such that the spring also holds the pinion or center shaft gear against the reel frame.

When casting a spincast reel, a user initially presses and holds the thumb button whereby the main shaft and the spinner head move forward and the spinner head clamps the fishing line against the tapered forward wall of the front cover. The line is thus prevented from moving outward, i.e., is prevented from paying out during the power portion of the casting motion. The forward movement of the center shaft and spinner head also typically activates a locking mechanism that limits the rearward movement of the spinner head such that the spinner head is prevented from returning to its winding position and disengages the line-grasping mechanism.

At the end of the casting motion, the user releases the thumb button to allow the shaft spring to move the center shaft and the spinner head rearwardly such that the fishing line is no longer clamped against the tapered forward wall of the front cover. With the line released and the spinner head prevented from grasping or otherwise engaging the fishing line, the line flows freely over the forward end of the line spool and through a line opening provided in the forward end of the front cover.

After casting, the user returns the spinner head and the line-grasping mechanism to their winding positions by turning the crank handle. One or more cam lobes or other release mechanisms are typically provided on the frame or elsewhere in the reel for releasing the spinner head locking mechanism in response to rotational movement of the spinner head.

One potential area for reel malfunction relates to the pick-up pins. Under certain conditions, friction between the pick-up pins and the spinner head assembly or other structures result in preventing rotation when a load was applied. In particular, contact may occur due to deflection of structure that support and move a line pick-up member between retrieve and casting positions, e.g., a line pick-up arm.

SUMMARY OF THE INVENTION

The fishing reel of the invention includes a body including a frame having a front side and a rear side. The frame defines an axial orifice that communicates the front side and the rear side. A main shaft is slidably received in the axial orifice. In one embodiment, a spool is mounted on a shaft that shares a longitudinal axis with the main shaft. In some embodiments, the spool may be mounted on a spool boss that is part of the reel body and that shares a longitudinal axis with the main shaft.

A spinner head assembly is secured to the main shaft forward of the frame and the spool. The spinner head assembly has a plate portion and a circumferential wall portion protruding from the plate portion. The plate portion has a forward surface and a rearward surface. The forward surface has a first spring tab and a second spring tab protruding therefrom. The plate portion defines a first pivot orifice, a first slot, a second pivot orifice and a second slot. The circumferential wall portion defines a first pick-up pin orifice and a second pick-up pin orifice.

A first spring member is received in the first slot. The first spring member has an inner end and an outer end. First spring member additionally defines a flange and a receiving orifice that receives a fastener, such as a screw.

A first pin arm defines a first pivot end, a first pin end, a plate facing or engaging surface, and an inside surface. The first pin arm defines a first pivot orifice adjacent the first pivot end. The first pin arm further defines a first spring member orifice. The plate engaging surface defines a first receptacle on the plate engaging surface. The first receptacle further defines the first spring member orifice for receiving the inner end of the first spring member, wherein at least a portion the plate engaging surface defines a planar surface from the first pivot end to the first pin end of the first pin arm. The continuous planar surface results from the first pin arm having at least a portion that defines a substantially uniform thickness. The thickness of the first pin arm functions to increase stiffness and to constrain the line pick-up arm. The first pin arm is additionally restrained from deflection by the flange of the first spring member, which contacts the forward surface of the plate portion. Therefore, the first pin arm is pivotally affixed to the plate portion at the first pivot end and is slidably restrained at a second location along a length of first pin arm, preferably on a second side of a midpoint of first pin arm, although stability and deflection resistance are increased by the addition of the slidable restraint at any location.

The first pin arm is pivotally mounted to the rearward surface of the plate portion by the first pivot member, wherein the affixing member is a threaded flange.

A first affixing member is received in the first pivot orifice. A wheel is mounted on the first spring member and is received in the first receptacle of the first pin arm. The wheel has a plate facing or engaging surface for sliding on the rearward surface of the plate portion when the first pin arm is pivoted about the first pivot member. In one embodiment, the wheel is rotationally mounted to the first pin arm for rotational engagement with reel structure.

A first pin spring has a first end in communication with the first spring tab and a second end in communication with the outer end of the first spring member. The first pin spring is provided for biasing the first pin arm to a retracted position.

A first pick-up pin extends from the first pin end of the first pin arm. The first pick-up pin is provided for selectively extending through the first pick-up pin orifice in the circumferential wall portion of the spinner head assembly.

A first pick-up sleeve is rotationally mounted on the first pick-up pin. The first pick-up sleeve is provided for engaging fishing line when the fishing line is to be wound onto the spool.

A second spring member is received in the second slot. The second spring member has an inner end and an outer end. The second spring member additionally defines a flange and a receiving orifice that receives a fastener, such as a screw.

A second pin arm defines a first pivot end, a first pin end, a plate engaging surface and an inside surface. The second pin arm defines a first pivot orifice adjacent the first pivot end. The second pin arm further defines a first spring member orifice. The plate engaging surface defines a receptacle on the plate engaging surface. The receptacle further defines the first spring member orifice for receiving the inner end of the second spring member, wherein at least a portion the plate engaging surface defines a planar surface from the first pivot end to the first pin end of the second pin arm. The continuous planar surface results from the second pin arm having at least a portion that defines a substantially uniform thickness. The thickness of the second pin arm functions to increase stiffness and to constrain the line pick-up arm. The first pin arm is additionally restrained from deflection by a flange of the second spring member, which contacts the forward surface of the plate portion. Therefore, the second pin arm is pivotally affixed to the plate portion at the first pivot end and is slidably restrained at a second location along a length of second pivot arm, preferably on a second side of a midpoint of second pivot arm, although stability and deflection resistance are increased by the addition of the slidable restraint at any location.

The second pin arm is pivotally mounted to the rearward surface of the plate portion by the second pivot member, wherein the affixing member is a threaded flange.

A second affixing member is received in the second pivot orifice. A wheel is mounted on the second spring member and is received in the spacer receptacle of the second pin arm. The wheel has a plate engaging surface for sliding on the rearward surface of the plate portion when the second pin arm is pivoted about the second pivot member. In one embodiment, the wheel is rotationally mounted to the second pin arm for rotational engagement with reel structure.

A second pin spring has a first end in communication with the first spring tab and a second end in communication with the outer end of the second spring member. The second pin spring is provided for biasing the second pin arm to a retracted position.

A second pick-up pin extends from the pin end of the second pin arm. The second pick-up pin is provided for selectively extending through the second pick-up pin orifice in the circumferential wall portion of the spinner head assembly.

A second pick-up sleeve is rotationally mounted on the second pick-up pin. The second pick-up sleeve is provided for engaging fishing line when the fishing line is to be wound onto the spool.

The unique design of the first pin arm and second pin arm, as well as the rotationally mounted first pick-up sleeve and second pick-up sleeve, result in improved smoothness of operation and an increase in reel reliability.

DETAILED DESCRIPTION OF THE PREFERRED EMBODIMENTS

Figure 1:
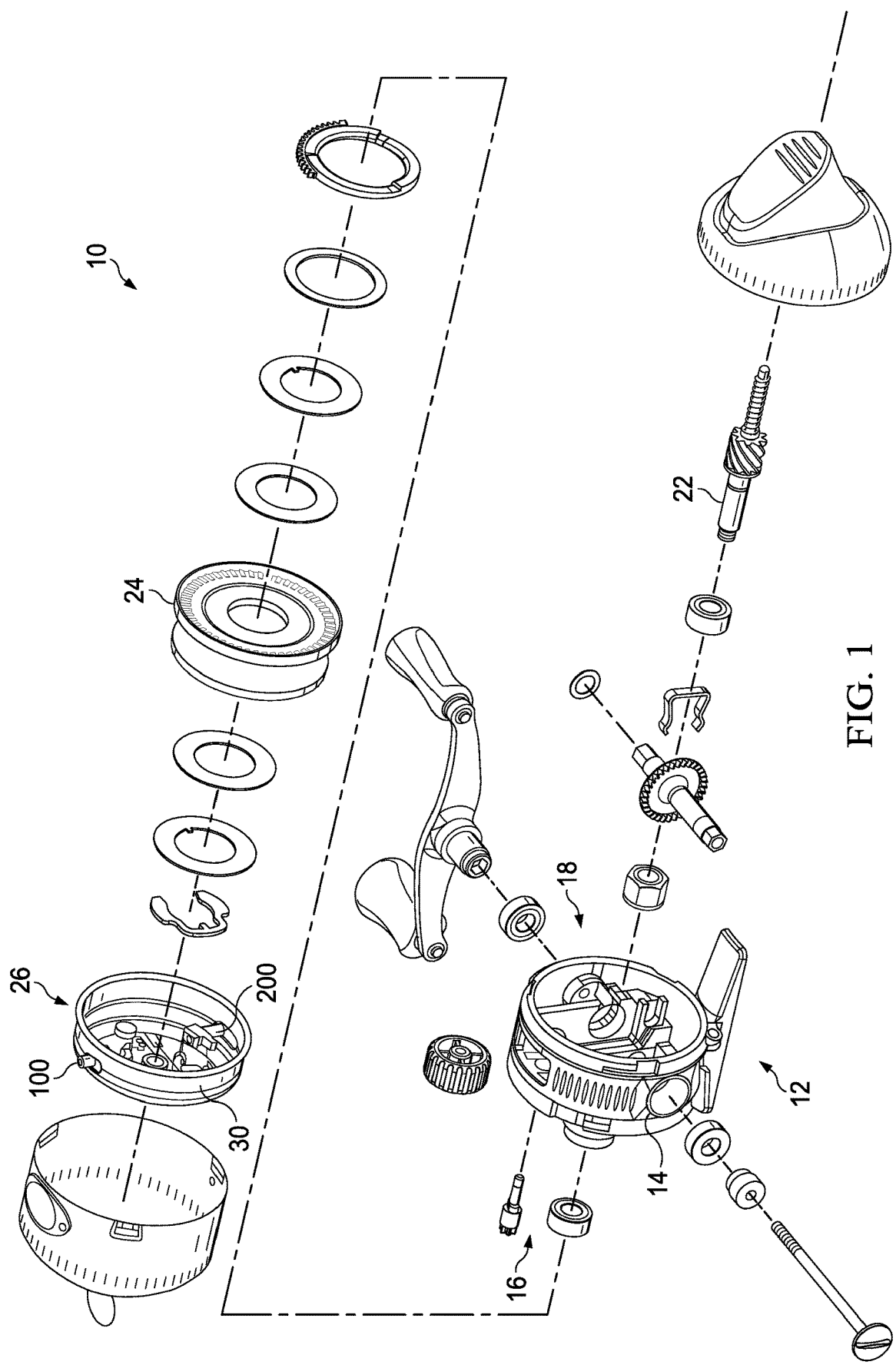
FIG. 1 is an exploded view of a spincast reel.

Referring now to the figures, fishing reel is designated generally 10. Fishing reel 10 includes a body 12 having a frame 14. Frame 14 has a front side 16 and a rear side 18. Frame 14 defines an axial orifice (not shown) that communicates front side 16 and rear side 18 of frame 14. Main shaft 22 is received within axial orifice 20. Spool 24 is rotatably mounted to rotate about a longitudinal axis of main shaft 22.

Spinner head assembly 26 is secured to main shaft 22 forward of frame 14 and spool 24. Spinner head assembly 26 includes plate portion 28 that is substantially perpendicular to main shaft 18. Spinner head assembly 26 further includes circumferential wall portion 30 that protrudes from plate portion 28 and is substantially parallel to main shaft 18.

Figure 2:
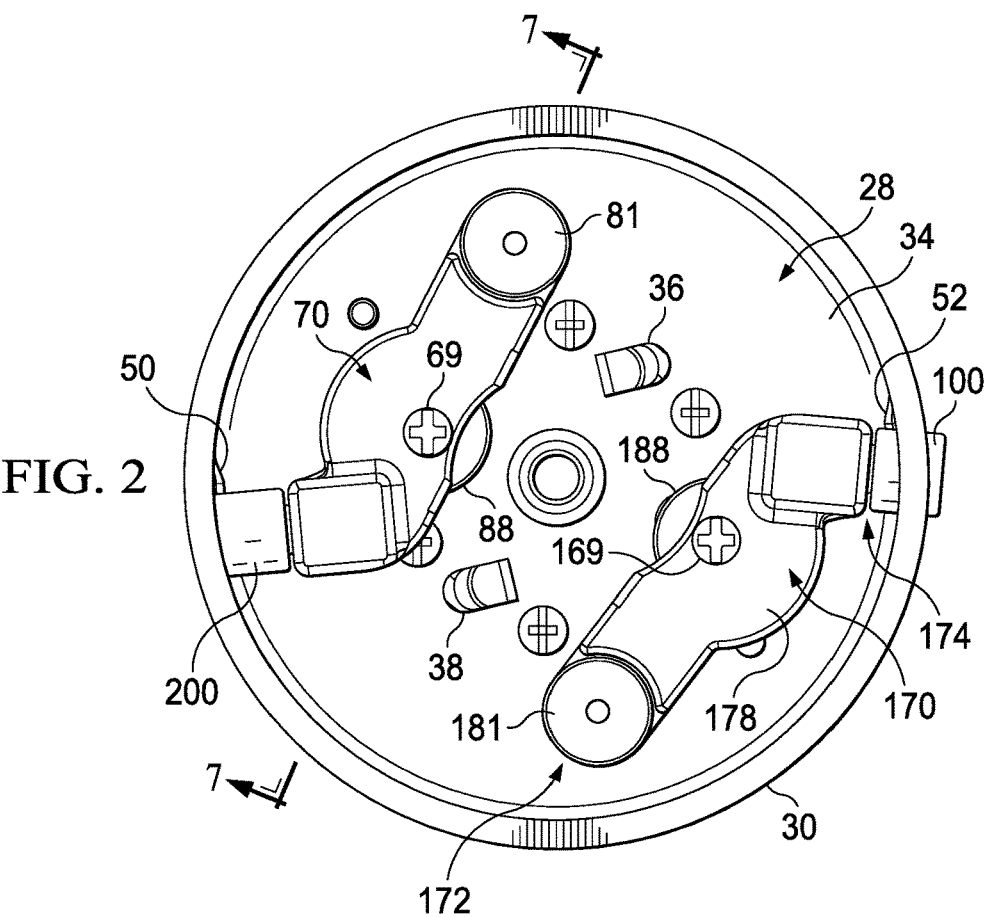
FIG. 2 is a plan view of a rear side of a spinner head assembly of FIG. 1.
Figure 3:
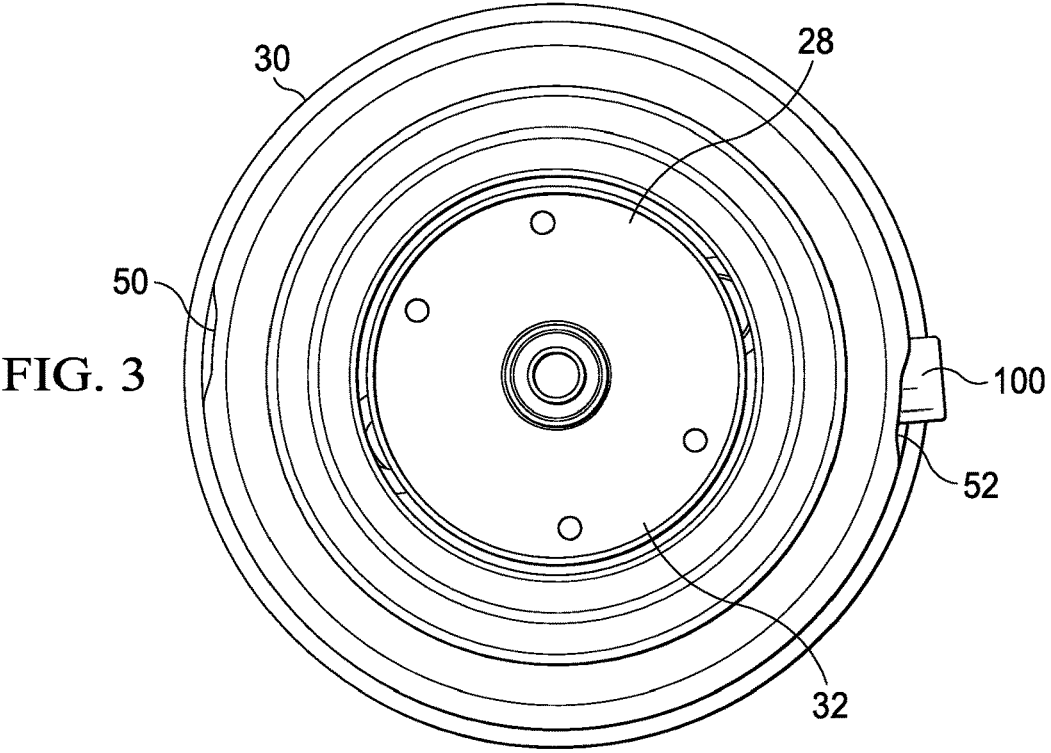
FIG. 3 is a plan view of a front side of the spinner head assembly of FIG. 1.
Figure 4:
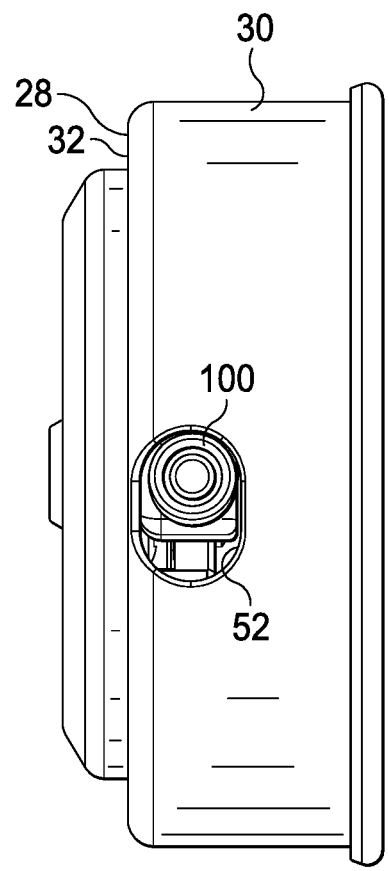
FIG. 4 is an elevation view of a side of the spinner head assembly of FIG. 1.
Figure 5:
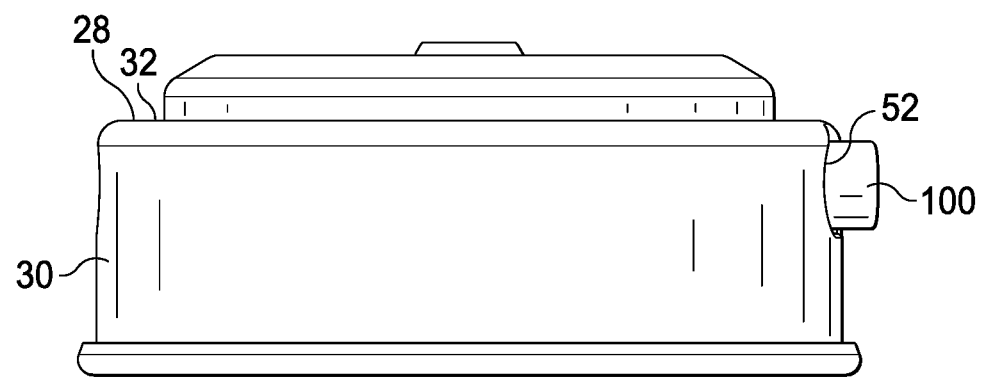
FIG. 5 is an elevation view of a side of the spinner head assembly of FIG. 1.
Figure 7:
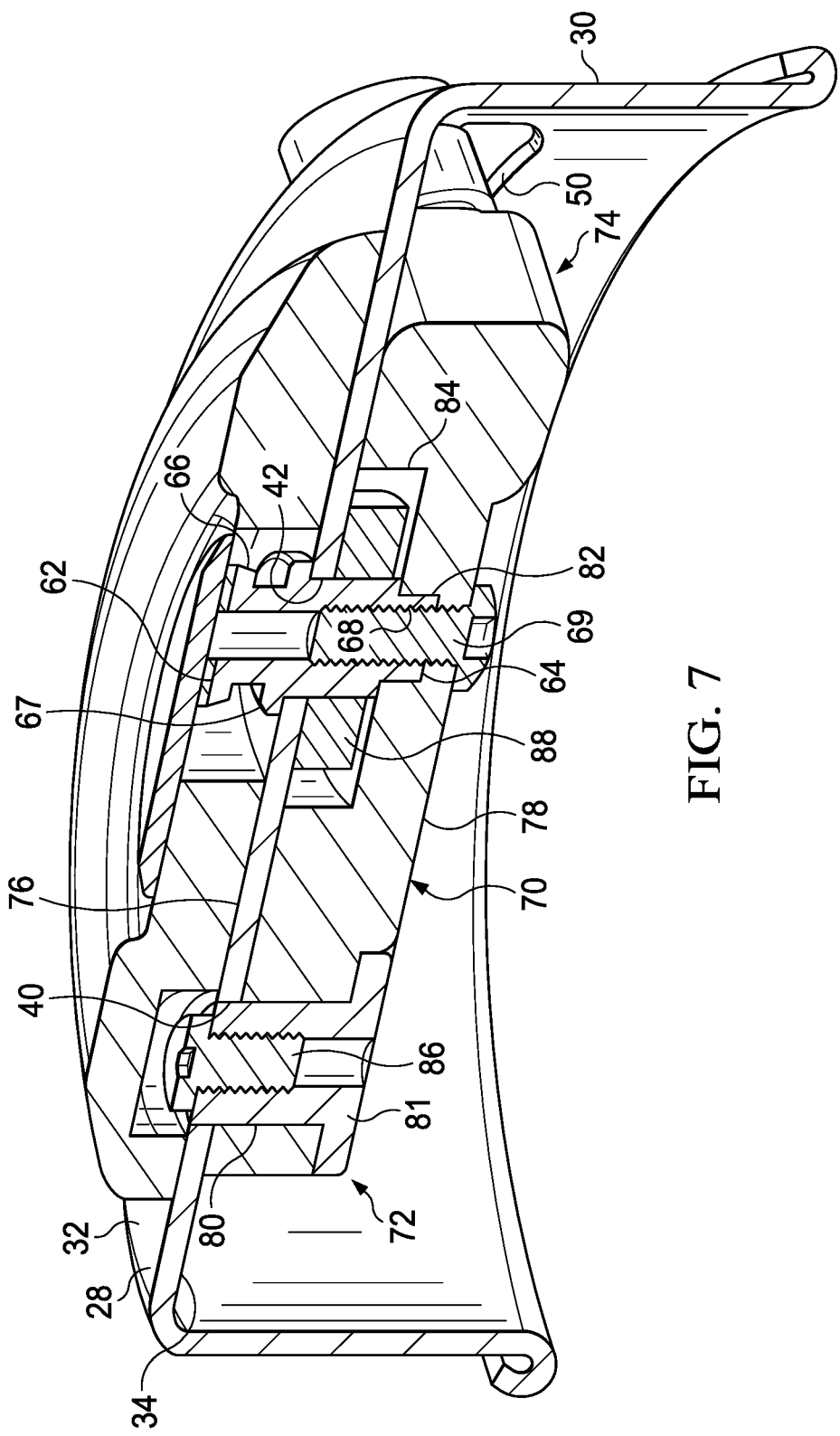
FIG. 7 is a cross-sectional perspective view of the spinner head assembly of FIGS. 2 and 3 taken along lines 7-7 of FIG. 2.
Figure 8:
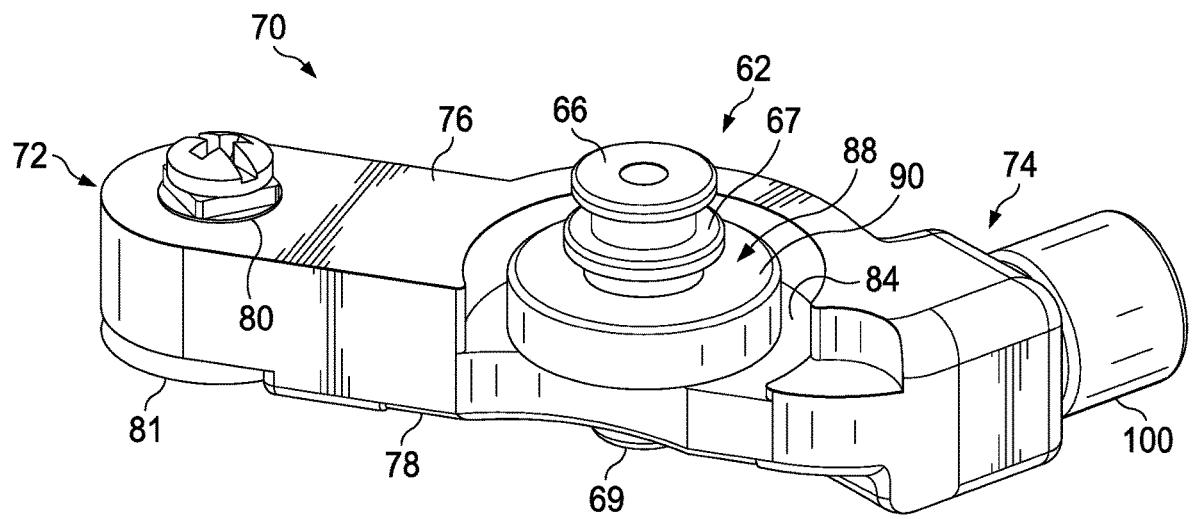
FIG. 8 is a perspective view of the pin arm of FIG. 2.

Plate portion 28 has a forward surface 32 (FIGS. 3-5) and a rearward surface 34 (FIG. 2). Rearward surface 34 defines first spring tab 36 and second spring tab 38 that protrudes therefrom. Plate portion 28 defines first pivot orifice 40, first slot 42 (FIG. 7), second pivot orifice (not shown), and second slot (not shown).

Circumferential wall portion 30 defines first pick-up pin orifice 50 and second pick-up pin orifice 52.

First spring member 62 is received in first slot 42. First spring member 62 has an inner end 64 and an outer end 66. First spring member 62 additionally defines flange 67 and receiving orifice 68 that receives fastener 69, such as a screw. A head of fastener 69 engages inside surface 78 of first pin arm 70 and maintains flange 67 in close proximity to forward surface 32 of plate 76 of spinner head assembly 26.

Figure 9:
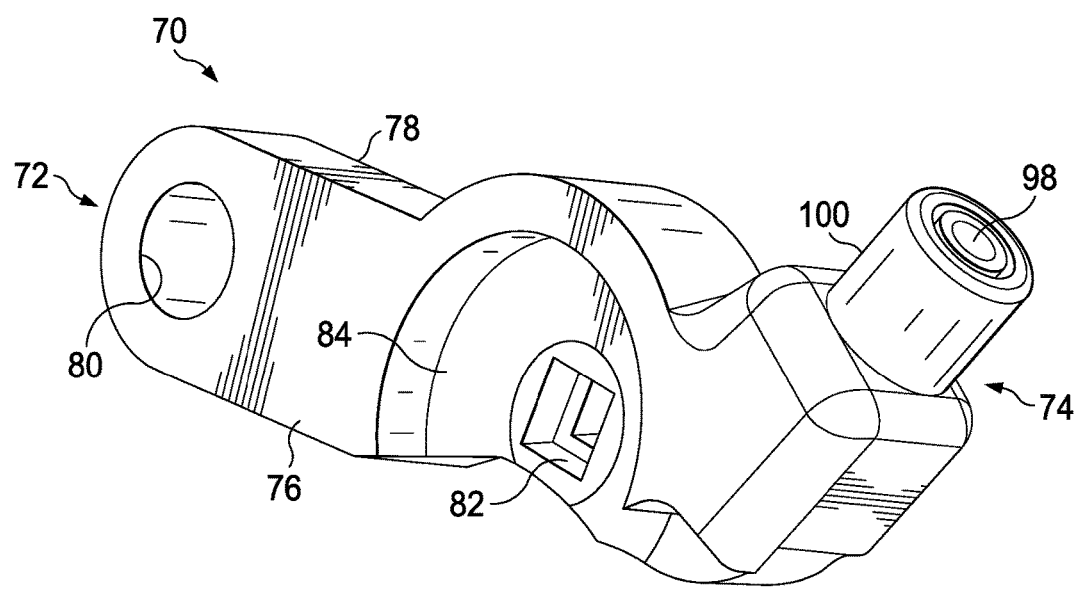
FIG. 9 is a perspective view of the pin arm of FIGS. 2 and 7.
Figure 12:
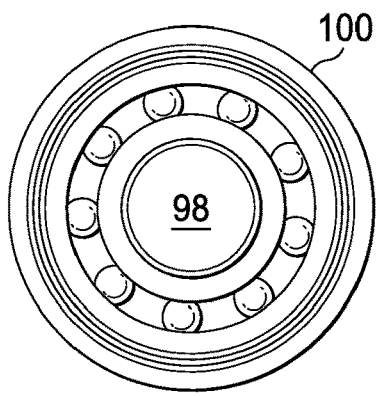
FIG. 12 is an end view of the pick-up pin assembly of FIG. 9.
Figure 10:
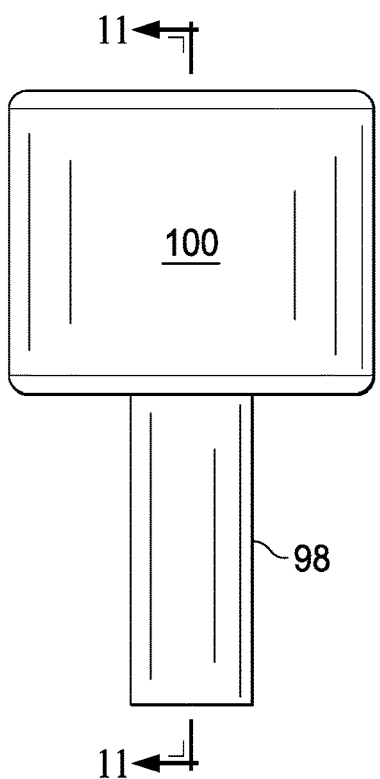
FIG. 10 is a plan view of the pick-up pin assembly of FIG. 2.
Figure 11:
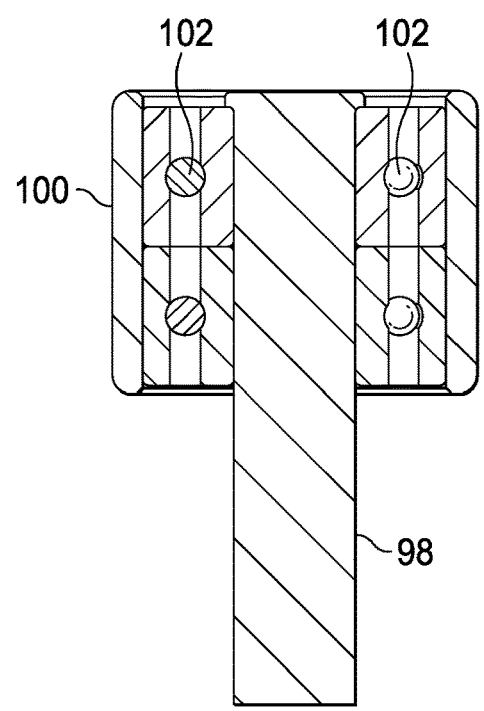
FIG. 11 is a cross-sectional view of the pick-up pin assembly of FIG. 9, taken along line 11-11 of FIG. 9.
Figure 13:
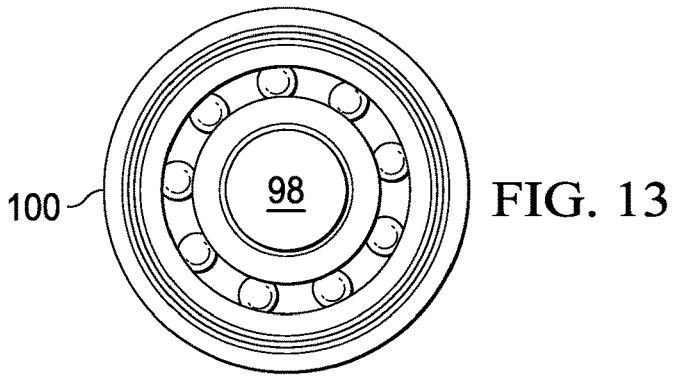
FIG. 13 is an end view of the pick-up pin assembly of FIG. 9.

First pin arm 70 defines first pivot end 72, first pin end 74, plate facing or engaging surface 76, and inside surface 78. First pin arm 70 defines first pivot orifice 80 adjacent to first pivot end 72. First pin arm 70 further defines first spring member orifice 82 (FIG. 9). Plate engaging surface 76 of first pin arm 70 may define first wheel receptacle 84. First wheel receptacle 84 further defines first spring member orifice 82 for receiving inner end 64 of first spring member 62. At least a portion of plate engaging surface 76 defines a planar surface from first pivot end 72 to first pin end 74 of first pin arm 70. The portion of first pin arm 70 adjacent to first wheel receptacle 84 and forming a portion of the planar surface is provided to reinforce first pin arm 70 to limit deflection of first pin arm 70. Pin arm 70 is further restrained from deflection by flange 67 of first spring member 62.

First pin arm 70 is pivotally mounted to rearward surface 34 of plate portion 28 by first affixing member 86. First affixing member 86 is received in first pivot orifice 80. In a preferred embodiment, affixing member 86 is threadably received in threaded flange 81.

Figure 14:
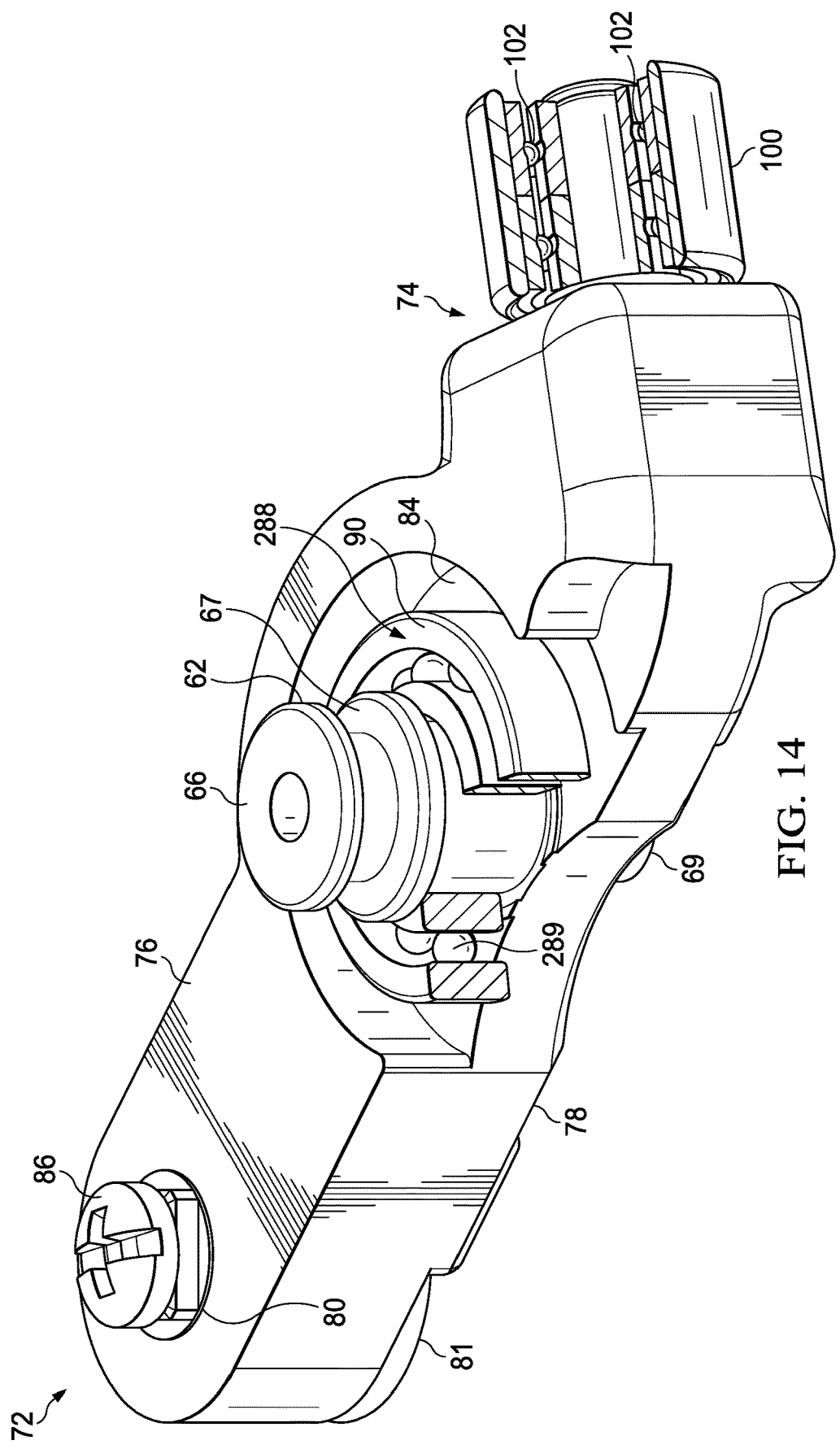
FIG. 14 is a perspective view of a second embodiment of the pin arm of FIG. 2 shown with cross-sectional views of the spacer and pick-up sleeve.

Wheel 88 is mounted on first spring member 62 and received in first receptacle 84 of first pin arm 70. Wheel 88 has plate facing or engaging surface 90 for sliding on rearward surface 34 of plate portion 28 when first pin arm 70 is pivoted about first affixing member 86. In one embodiment, bearing spacer 288 (FIG. 14) is rotationally mounted to first pin arm 70. Ball bearings 289 may be provided to facilitate rotation. In another embodiment, wheel 88 may be integrally formed with first pin arm 70. Wheel 88 may engage rotating structure on main shaft 22.

Figure 6:
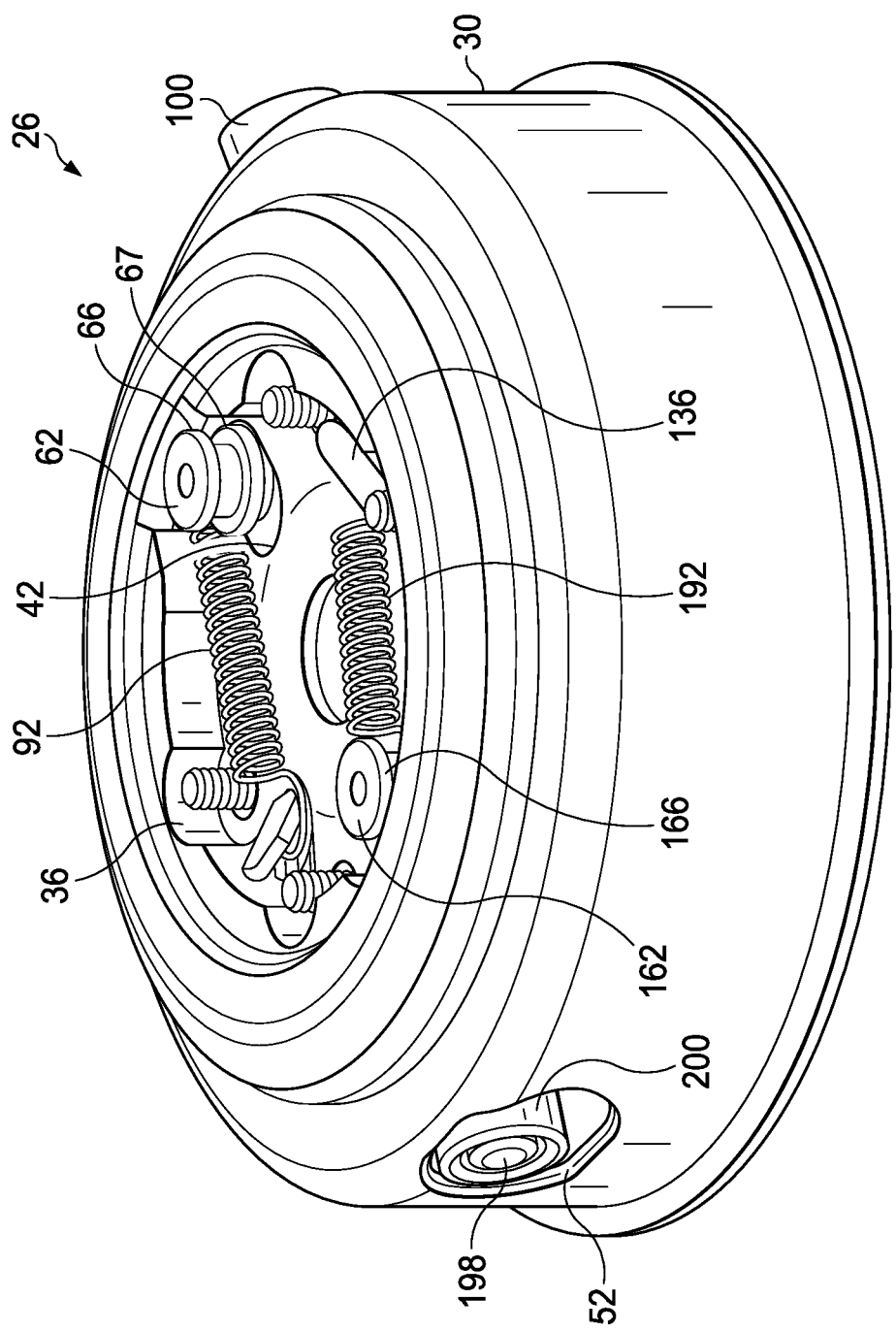
FIG. 6 is a perspective view of the spinner head assembly of FIG. 1.

Referring now to FIG. 6, first pin spring 92 has a first end in communication with first spring tab 36. First pin spring 92 has a second end that communicates with outer end 66 of first spring member 62. First pin spring 92 is for biasing first pin arm 70 to a retracted position.

First pick-up pin 98 (FIG. 9) extends from first pin end 74 of first pin arm 70. First pick-up pin 98 is for selectively extending through first pick-up pin orifice 50 in circumferential wall portion 30 of spinner head assembly 26.

First pick-up pin sleeve 100 is rotationally mounted on first pick-up pin 98. In a preferred embodiment, first pick-up pin sleeve 100 is mounted to first pick-up pin 98 with one or more bearings 102 therebetween (see, e.g., FIG. 14). In one embodiment, bearings 102 are roller bearings. First pick-up sleeve 100 is for engaging fishing line when fishing line is to be wound onto spool 24.

The components associated with second pin arm 170 (FIG. 2) are the same as components associated with first pin arm 70. Where components associated with second pin arm 170 are visible, these components are labeled. When not visible, these components should be understood to have the same construction as corresponding components associated with first pin arm 70. Second pivot member is received in second pick-up pin orifice. Second spring member 162 (FIG. 6) is received in second slot. Second spring member 162 has an inner end and an outer end 166 (FIG. 6). Second spring member 162 additionally defines a flange and receiving orifice for receiving a fastener, similar to first spring member 62.

Second pin arm 170 (FIG. 2) defines second pivot end 172, second pin end 174, a plate facing or engaging surface, and inside surface 178. Second pin arm 170 defines second pivot orifice (not shown) adjacent to second pivot end. Second pin arm 170 further defines second spring member orifice. Plate engaging surface of second pin arm 170 defines a second receptacle. Second receptacle further defines second spring member orifice for receiving inner end of second spring member 162. At least a portion of plate engaging surface defines a planar surface from second pivot end to second pin end 172 of second pin arm 170. Fastener 169 (FIG. 2) passes through second pin arm 170 for securing second spring member 162.

Second pin arm 170 is pivotally mounted to rearward surface 34 of plate portion 28 by second affixing member 186. Second affixing member 186 is received in second pivot orifice. In a preferred embodiment, second affixing member 186 is threadably received in a threaded flange (not shown).

Wheel 188 is mounted on second spring member 162 and received in the second receptacle of second pin arm 170. Wheel 188 has plate facing or engaging surface for sliding on rearward surface 34 of plate portion 28 when second pin arm 170 is pivoted about second affixing member 186. In one embodiment, wheel 188 is rotationally mounted to second pin arm 170. Bearings, such as ball bearings, may be provided to facilitate rotation. In another embodiment, wheel 188 may be integrally formed with second pin arm 170.

Second pin spring 192 (FIG. 6) has first end in communication with second spring tab 136. Second pin spring 192 has second end that communicates with outer end 166 of second spring member 162. Second pin spring 192 is for biasing second pin arm 170 to a retracted position. In the exemplary embodiment, first pin spring 92 and second pin spring 192 are located adjacent to forward surface 32 of spinner head assembly 26. In other embodiments, first pin spring 92 and second pin spring 192 may be located adjacent to rearward surface 34 of spinner head assembly 26.

Still referring to FIG. 6, second pick-up pin 198 extends from second pin end 174 of second pin arm 170. Second pick-up pin 198 is for selectively extending through second pick-up pin orifice 52 in circumferential wall portion 30 of spinner head assembly 26. Although an embodiment having two pin arms, i.e., first pin arm 70 and second pin arm 170, are shown in figures, it should be understood that the reel of the invention could be made with a single pin arm, three, or more pin arms. Additionally, although first pin arm 70 and second pin arm 170 are shown as being pivotally mounted, other configurations are possible, including linear actuated pins wherein the pin arms move radially to pass pick-up pins through the pick-up pin orifice.

Second pick-up pin sleeve 200 is rotationally mounted on second pick-up pin 198. In a preferred embodiment, second pick-up pin sleeve 200 is mounted to second pick-up pin 198 on one or more bearings.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A fishing reel comprising:
a spool mounted for rotating about a longitudinal axis defined by a main shaft;
a spinner head assembly secured to said main shaft forward of said spool, said spinner head assembly having a plate portion and a circumferential wall portion protruding rearwardly from said plate portion, said plate portion defining a rearward surface;
said circumferential wall portion defining a first pick-up pin orifice;
a first pin arm defining a first pivot end, a first pin end, a plate facing surface and an inside surface, said first pin arm pivotally mounted to said rearward surface of said plate portion;
a first pick-up pin extending from said first pin end of said first pin arm, said first pick-up pin for selectively extending through said first pick-up pin orifice in said circumferential wall portion of said spinner head assembly;
a first pick-up sleeve rotationally mounted on said first pick-up pin with bearings therebetween, said first pick-up sleeve for engaging fishing line when fishing line is wound onto said spool.

2. A fishing reel according to claim 1 wherein:
said plate facing surface of said first pin arm has at least a portion that defines a planar surface from said first pivot end to said first pin arm.

3. The fishing reel according to claim 1 wherein:
said plate portion further having a forward surface, said plate portion defining a first slot;
a first spring member received in said first slot, said first spring member having an inner end and an outer end.

4. The fishing reel according to claim 3 wherein said:
said plate facing surface of said first pin arm defining a first receptacle, said first receptacle further defining a first spring member orifice for receiving said inner end of said first spring member, wherein at least a portion of said plate facing surface of said first pin arm defines a planar surface from said first pivot end to said first pin end of said first pin arm.

5. The fishing reel according to claim 4 wherein:
said first pin arm further defining a first pivot arm orifice adjacent said first pivot end;
said plate portion defining a first pivot orifice;
a flange received in said first pivot arm orifice of said first pin arm in said first pivot orifice of said plate portion of said spinner head assembly;
said flange pivotally affixing said first pin arm to said plate portion of said spinner head assembly.

6. The fishing reel according to claim 5 further comprising:
a wheel mounted adjacent to said first spring member and received in said first receptacle of said first pin arm, said wheel having a plate facing surface for sliding movement with respect to said rearward surface of said plate portion when said first pin arm is pivoted about said first affixing member.

7. The fishing reel according to claim 3 wherein:
said plate portion further comprises a first spring tab and a second spring tab that extend from said forward surface; and further comprising:
a first pin spring having a first end in communication with said first spring tab, said first pin spring having a second end in communication with said outer end of said first spring member, said first pin spring for biasing said first pin arm to a retracted position.

8. The fishing reel according to claim 1 further comprising:
a second pin arm defining a second pivot end, a second pin end, a plate facing surface and an inside surface, said second pin arm pivotally mounted to said rearward surface of said plate portion of said spinner head assembly;
said circumferential wall portion of said spinner head assembly further defines a second pick-up pin orifice for receiving said second pick-up pin.

9. The fishing reel according to claim 8 further comprising:
a second pick-up pin extending from said second pin end of said second pin arm, said second pick-up pin for selectively extending through said second pick-up pin orifice in said circumferential wall portion of said spinner head assembly;
a second pick-up sleeve rotationally mounted on said second pick-up pin, said second pick-up sleeve for engaging fishing line when fishing line is wound onto said spool.

10. The fishing reel according to claim 8 wherein:
said plate facing surface of said second pin arm has at least a portion that defines a planar surface from said second pivot end to said second pin arm.

11. The fishing reel according to claim 1 wherein:
said first pin arm pivotally mounted to said rearward surface of said plate portion proximate said first pivot end and slidably secured to said plate portion at a second location for preventing deflection of said first pin arm.

12. A fishing reel comprising:
a spool mounted for rotating about a longitudinal axis defined by a main shaft;
a spinner head assembly secured to said main shaft forward of said spool, said spinner head assembly having a plate portion and a circumferential wall portion protruding rearwardly from said plate portion, said plate portion defining a rearward surface, a forward surface and a first slot;
said circumferential wall portion defining a first pick-up pin orifice;
a first pin arm defining a first pivot end, a first pin end, a plate facing surface and an inside surface;
said first pin arm pivotally mounted to said rearward surface of said plate portion proximate said first pivot end;
a member affixed to said first pin arm and extending through said first slot of said plate portion, said member having structure for contact with said forward surface of said plate portion for preventing deflection of said first pin arm;
a first pick-up pin extending from said first pin end of said first pin arm, said first pick-up pin for selectively extending through said first pick-up pin orifice in said circumferential wall portion of said spinner head assembly;
a first pick-up sleeve rotationally mounted on said first pick-up pin, said first pick-up sleeve for engaging fishing line when fishing line is wound onto said spool.

13. A fishing reel comprising:
a spool mounted for rotating about a longitudinal axis defined by a main shaft;
a spinner head assembly secured to said main shaft forward of said spool, said spinner head assembly having a plate portion and a circumferential wall portion protruding rearwardly from said plate portion, said plate portion defining a rearward surface, a forward surface and a first slot;
said circumferential wall portion defining a first pick-up pin orifice and a second pick-up pin orifice;
a first pin arm defining a first pivot end, a first pin end, a plate facing surface and an inside surface, said first pin arm pivotally mounted to said rearward surface of said plate portion proximate said first pivot end;
a member affixed to said first pin arm and extending through said first slot of said plate portion, said member having structure for contact with said forward surface of said plate portion for preventing deflection of said first pin arm;
a first pick-up pin extending from said first pin end of said first pin arm, said first pick-up pin for selectively extending through said first pick-up pin orifice in said circumferential wall portion of said spinner head assembly;
a second pin arm defining a second pivot end, a second pin end, a plate facing surface and an inside surface, said second pin arm pivotally mounted to said rearward surface of said plate portion proximate said second pivot end;
a second pick-up pin extending from said second pin end of said second pin arm, said second pick-up pin for selectively extending through said second pick-up pin orifice in said circumferential wall portion of said spinner head assembly;
a second pick-up sleeve rotationally mounted on said second pick-up pin, said second pick-up sleeve for engaging fishing line when fishing line is wound onto said spool.

* * * * *